United States Patent [19]

Sullivan

[11] Patent Number: 4,729,448

[45] Date of Patent: Mar. 8, 1988

[54] OFFSET TRUNNION BRACKET ON STEER DRIVE AXLE

[75] Inventor: James L. Sullivan, Rochester, Mich.

[73] Assignee: Rockwell International Corporation, Pittsburgh, Pa.

[21] Appl. No.: 8,996

[22] Filed: Jan. 30, 1987

[51] Int. Cl.$^4$ .............................................. B62D 5/06
[52] U.S. Cl. ..................................... 180/161; 180/254
[58] Field of Search ............... 180/154, 155, 156, 157, 180/158, 159, 160, 253, 254, 255, 256, 257, 258, 259, 260, 261, 262, 263

[56] References Cited

U.S. PATENT DOCUMENTS 4,592,440 6/1986 Ujita et al. ........................... 180/155

FOREIGN PATENT DOCUMENTS 1478629 7/1977 United Kingdom ................ 180/155

*Primary Examiner*—John A. Pekar

[57] ABSTRACT

A planetary drive axle has an offset trunnion bracket to permit a steering actuator to move in a horizontal plane while the axle oscillates in a vertical plane. The differential-receiving bowl is machined on centerlines offset laterally and downward from the pinion and axle centerlines and from the trunnion centerline. A steer cylinder bracket is mounted on the bowl within a trunnion bearing downward from the trunnion centerline. As the body which is mounted on trunnion brackets oscillates around the trunnions, the steering actuator remains in the plane of the axle and clears the trunnion brackets.

6 Claims, 3 Drawing Figures

OFFSET TRUNNION BRACKET ON STEER DRIVE AXLE

BACKGROUND OF THE INVENTION

Trunnion mounted planetary rigid non-steering drive axles have been known in the art. Steer-drive planetary axles have been known. Trunnion mounted steer-drive planetary axles have not been found in the prior art. One of the problems which has existed is that known steering system would not allow trunnion mounting. Another problem is that trunnion mountings and steering would be mutually interferring so that oscillating around the trunnions would have to be limited or turning of the wheels would have to be limited. The present invention seeks to overcome those problems.

SUMMARY OF THE INVENTION

A planetary drive axle has an offset trunnion bracket to permit a steering actuator to move in a horizontal plane while the axle oscillates in a vertical plane. The differential-receiving bowl is machined on centerlines offset laterally and downward from the pinion and axle centerlines and from the trunnion centerline.

A steer cylinder bracket is mounted on the bowl within a trunnion bearing downward from the trunnion centerline. As the body which is mounted on trunnion brackets oscillates around the trunnions, the steering actuator remains in the plane of the axle and clear the trunnion brackets.

In a preferred embodiment of the invention a steer-drive axle housing apparatus for supporting a trunnion bracket has a differential-receiving bowl centered around a first vertical plane extending fore and aft through the bowl and centered around a first horizontal plane extending through the bowl. First and second axle housing arms extend laterally oppositely from the differential-receiving bowl. First and second steering knuckles are respectively mounted on opposite ends of the axle housing arms remote from the bow. Steering arms are connected to the steering knuckles. First and second trunnion bearings respectively are mounted fore and aft on the bowl and are centered on a trunnion axis running fore and aft through the bowl.

The trunnion axis is offset from at least one of the said plane.

Preferably, the trunnion axis is offset from the first horizontal plane about which the bowl is centered. In a preferred embodiment the trunnion axis is offset from the second vertical plane about which the bowl is centered. Preferably the trunnion axis is offset from both the first and second plane.

The preferred apparatus further has a steer cylinder bracket mounted on the bowl and extended horizontally from a part of the bowl surrounded by one of the trunnion bearings.

Preferably the steer cylinder bracket is centered on the horizontal plane and is offset downward from the trunnion axis. In one preferred embodiment the steer cylinder bracket is centered beneath the trunnion axle.

In one preferred embodiment the steer cylinder bracket is centered beneath the trunnion axis. In one preferred embodiment a steering actuator is connected between the steer cylinder bracket and one of the steering arms. Trunnion brackets are mounted on the trunnion bearings. One of the trunnion brackets clears the steering actuator as the trunnion brackets pivot about the trunnion bearings and as the steering actuator is extended and compressed to move the steering arm.

Preferably trunnion mounted axle housing apparatus has an axle housing with a differential-receiving bowl and two axle housing arms extending laterally therefrom. First and second circular trunnion bearings are mounted respectively fore and aft on the bowl. The trunnion bearings are aligned on a trunnion axis extending fore and aft horizontally through the bowl. The bowl is centered on a bowl axis extending fore and aft horizontally through the bowl. The trunnion axis and the bowl axis are offset.

Preferably the trunnion axis is both laterally and vertically offset from the bowl axis. A steer cylinder bracket is mounted on the bowl and extends horizontally from a part of the bowl surrounded by one of the trunnion bearings.

The steer cylinder bracket is centered on a horizontal plane thru the bowl axis and is offset downward from the trunnion axis. Preferably the steer cylinder bracket is centered beneath the trunnion axis.

The preferred apparatus further has first and second steer cylinder knuckles respectively mounted on opposite ends of the axle housing arms remote from the bowl and steering arms connected to the steering knuckles, a steering actuator connected between the steer cylinder bracket and one of the steering arms (or one steel actuator to each steering arm) and trunnion brackets mounted on the trunnion bearings, whereby one of the trunnion brackets clears the steering actuator as the trunnion brackets pivot about the trunnion bearings and as the steering actuator is extended and compressed to move the steering arm.

In one preferred form of the invention a drive axle housing has a differential receiving portion of generally convex outer curvature in an axial direction on one side face thereof. An aperture exists in the other side face of said differential-receiving portion. Two oppositely extension beam arms have rectangular cross-section. Each said beam arm terminates in a bell shaped yoke.

A pair of steering knuckles are provided. Each steering knuckle has a yoke overlapping on the bell shaped yokes. An outwardly projecting hollow spindle rotatably mounts a wheel thereon.

Axially aligned bores and pin means in each steering knuckle yoke and bell-shaped yoke pair define a steering axis for the wheel mounted on each respective knuckle spindle.

A differential carrier assembly is secured to the apertured side wall of the differential receiving portion of said axle.

First and second cylindrical bearing surfaces are provided on the outer surface of said differential carrier assembly, and the outer surface of said differential receiving-portion of said axle housing respectively. said first and second bearing surfaces are in axial alignment with each other.

A first trunnion has a cylindrical bearing surface seated for rotation relative to the first cylindrical bearing surface.

A second trunnion has a cylindrical bearing surface seated for rotation relative to the second cylindrical bearing surface, plates on the first trunnion and said second trunnion respectively secure the first and second trunnions to the frame of the vehicle.

A hydraulic steering cylinder and piston are secured at one end to one side face of said differential receiving portion of the axle housing and are secured at the other end to one of the steering knuckles.

Extension and retraction of said steering cylinder piston pivots the knuckle about the steering axis and turns the wheel rotatably mounted to said axle. The trunnion secured to the vehicle oscillates about the first and second bearing surfaces as said vehicle traverses uneven terrain while said which axle and said steering cylinder maintain their respective relative alignment.

These and further and other objects and features of the invention are apparent in the disclosure which includes the following drawings.

DETAILED DESCRIPTION OF THE DRAWINGS

Figure 1:
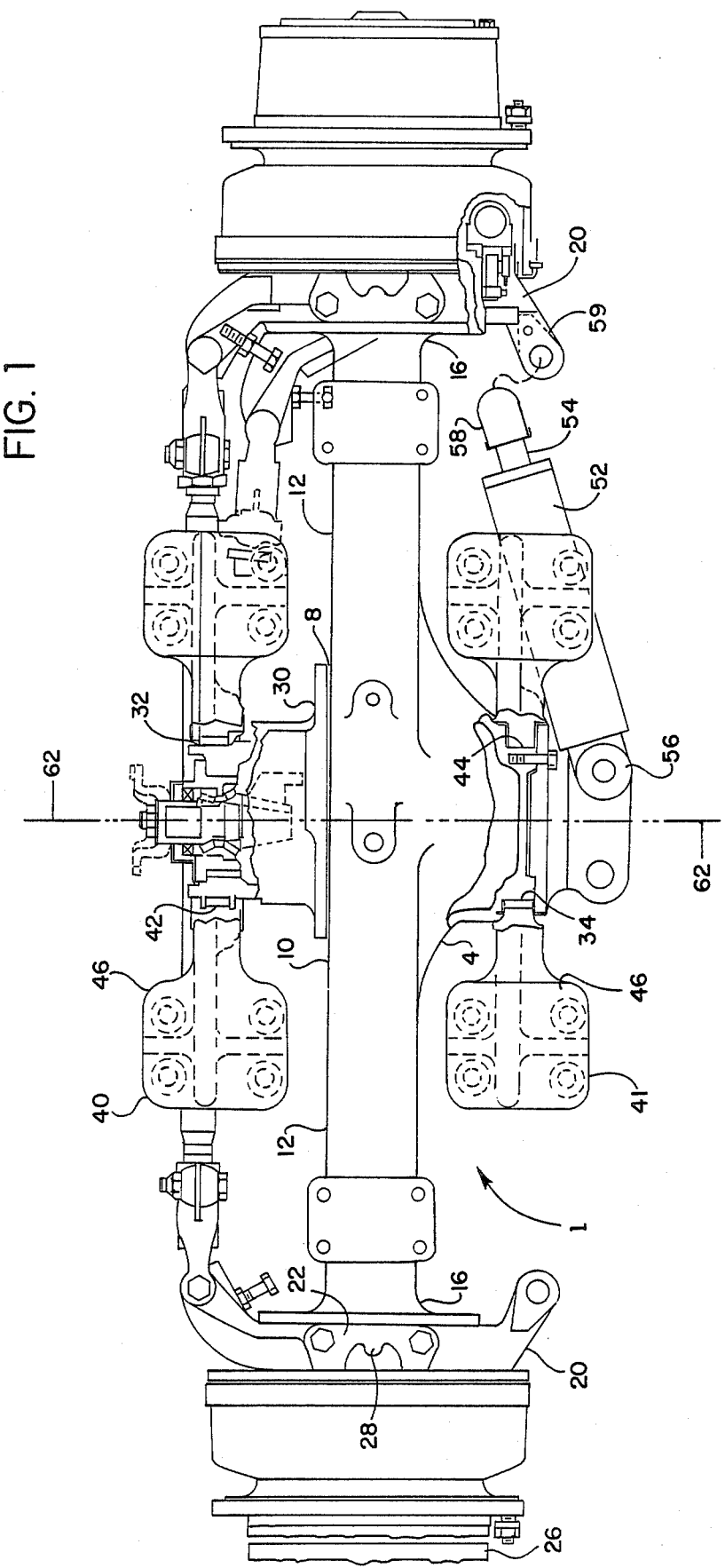
FIG. 1 is a plan view of the trunnion mounted steer drive axle of the present invention.
Figure 2:
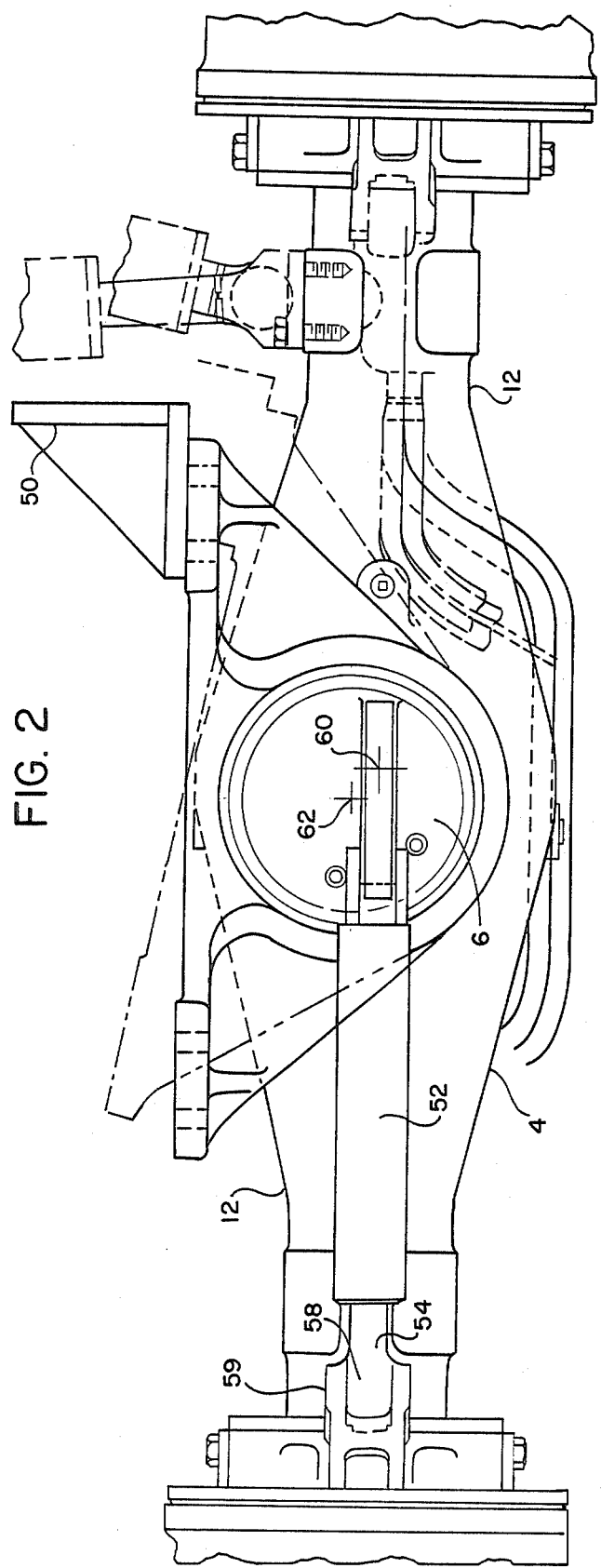
FIG. 2 is a rear elevational view of a rear trunnion mounted steer drive axle of the present invention.
Figure 3:
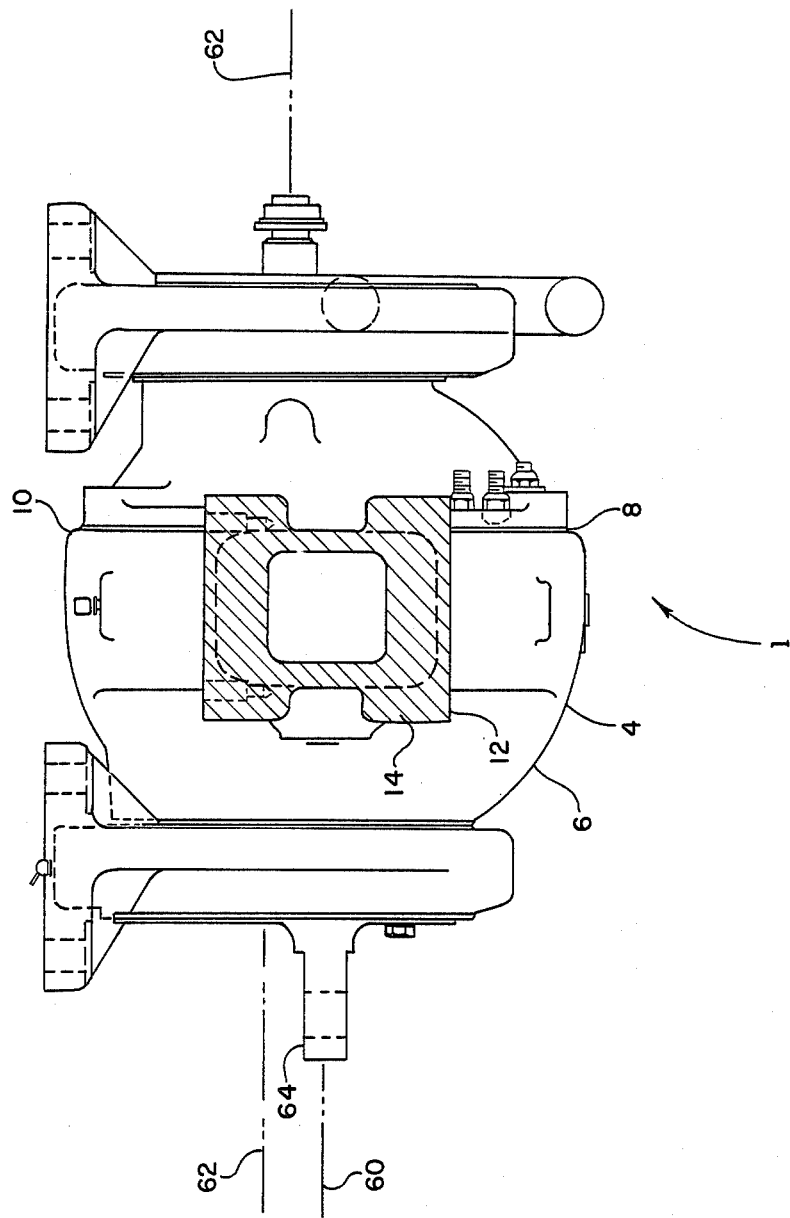
FIG. 3 is a side elevation of the trunnion mounted steer drive axle of the present invention.

In one preferred form of the invention as shown in FIGS. 1-3, a drive axle housing has a differential receiving portion 4 of generally convex outer curvature in an axial direction on one side face 16 thereof. As shown in FIGS. 2 and 3. apertures 8 exists in the other side face 10 of said differential-receiving portion 4. Two oppositely extending beam arms 12 have rectangular cross-section 14. Each said beam arms terminates in a bell shaped yoke 16.

A pair of steering knuckles 20 are provided. Each steering knuckle 20 has a yoke 22 overlapping one of the bell shaped yokes 16. An outwardly projecting hollow spindle 24 rotatably mounts a wheel 26 thereon.

Axially aligned bores and pins 28 in each steering knuckle yoke and bell-shaped yoke pair define a steering axis from the wheel mounted on each respective knuckle spindle.

A differential carrier assembly 30 is secured to the apertured side wall 10 of the differential receiving portion 4 of said axle.

First and second cylindrical bearing surfaces 32, 34 are provided on the outer surface of said differential carrier assembly 30 and the outer surface of said differential receiving-portion of said axle housing 1 respectively.

The first and second bearing surfaces 32 and 34 are in axial alignment with each other.

A first trunnion bracket 40 has a cylindrical bearing surface 42 seated for rotation relative to the first cylindrical bearing surface 32. A second trunnion bracket 41 has a cylindrical bearing surface 44 seated for rotation relative to the second cylindrical bearing surfaces 34.

Plates 46 on the first trunnion 40 and said second trunnion 41 respectively secure the first and second trunnions to the frame 50 of a vehicle.

A hydraulic steering cylinder 52 and piston 54 is secured at one end 56 to one side face 6 of said differential receiving portion 4 of the axle housing and is secured at the other end 58 to a steering arm 59 on one of the steering knuckles 20.

Extension and retraction of said steering cylinder 52 and piston 54 pivots the knuckle 20 about the steering axis and turns the wheel rotatably mounted to said axle. The trunnion 40, 41 secured to the vehicle oscillate about the first and secured bearing surfaces 32, 34 as said vehicle traverses uneven terrain while said vehicle axle and said steering cylinder maintain their respective relative alignment.

The planetary drive axle housing 1 has offset trunnion brackets 40, 41 to permit the steering actuator 52, 54 to move in a horizontal plane while the axle housing 1 oscillates in a vertical plane. The differential-receiving bowl 4 is mounted on a centerline 60 offset laterally and downward from the pinion centerline 62 and from the same trunnion centerline 62.

A steering bracket 64 is mounted on the bowl 4 within a trunnion bearing 34 downward from the trunnion centerline 62. As the body 50 which is mounted on trunnion brackets oscillates around the trunnion bearings 32, 34. the steering actuator 52, 54, remains in the plane of the axle housing 1 and clears the trunnion brackets 40, 41.

The trunnion axis 62 is offset from both the bowl axis 60 and the steering bracket 64.

While the invention has been described with reference to a specific embodiment modifications and variations may be constructed without departing from the scope of the following claims.

I claim:

1. Steer-driver axle housing apparatus for supporting a trunnion bracket comprising a differential-receiving bowl centered around a first vertical plane extending fore and aft through the bowl and a first horizontal plane extending through the bowl, first and second axle housing arms extending laterally oppositely from the differential-receiving bowl, first and second steering knuckles respectively mounted on opposite ends of the axle housing arms remote from the bowl, steering arms connected to the steering knuckles, first and second trunnion bearings respectively mounted fore and aft on the bowl and being centered on a trunnion axis running fore and aft through the bowl, the trunnion axis being offset from both the first and second planes, a steering bracket mounted on the bowl and extending horizontally from a part of the bowl surrounded by one of the trunnion bearings, and said steering bracket being centered on the horizontal plane and being offset downward from the trunnion axis.

2. The apparatus of claim 1 wherein the steering bracket is centered beneath the trunnion axis.

3. The apparatus of claim 2 further comprising a steering actuator connected between the steering bracket and one of the steering arms and trunnion brackets mounted on the trunnion bearings, whereby one of the trunnion brackets clear the steering actuator as the trunnion brackets pivot about the trunnion bearings and as the steering actuator is extended and compressed to move the steering arm.

4. Trunnion mounted axle housing apparatus comprising an axle housing having a differential-receiving bowl and two axle housing arms extending laterally therefrom, first and second circular trunnion bearings mounted respectively fore and aft on the bowl, the trunnion bearings being aligned on a trunnion axis extending fore and aft horizontally through the bowl, and the bowl being centered on a bowl axis extending fore and aft horizontally through the bowl, the the trunnion axis and the bowl axis being offset both laterally and vertically from the bowl axis, a steering bracket mounted on the bowl and extending horizontally therefrom within a part of the bowl surrounded by one of the trunnion bearings and the steering bracket being centered on a horizontal plane thru the bowl axis and being offset downward from the trunnion axis.

5. The apparatus of claim 4 wherein the steering bracket is centered beneath the trunnion axis.

6. The apparatus of claim 5 further comprising first and second steering knuckles respectively mounted on opposite ends of the axle housing arms remote from the bowl, steering arms connected to the steering knuckles, a steering actuator connected between the steering bracket and one of the steering arms and trunnion brackets mounted on the trunnion bearings, whereby one of the trunnion brackets clears the steering actuator as the trunnion brackets pivot about the trunnion bearings and as the steering actuator is extended and compressed to move the steering arm.

* * * * *